United States Patent [19]

Haberle

[11] Patent Number: 5,583,176
[45] Date of Patent: Dec. 10, 1996

[54] WATER-EMULSIFIABLE POLYISOCYANATES

[75] Inventor: Karl Häberle, Speyer, Germany

[73] Assignee: BASF Aktiengesellschaft, Ludwigshafen, Germany

[21] Appl. No.: 532,482

[22] Filed: Sep. 22, 1995

[30] Foreign Application Priority Data

Sep. 23, 1994 [DE] Germany ............... 44 33 929.1

[51] Int. Cl.$^6$ ............... C08J 3/00; C08K 3/20; C08L 75/00
[52] U.S. Cl. ............... 524/591; 524/590; 524/839; 524/840; 525/123; 525/127; 525/455; 528/49; 528/60; 528/61; 528/65; 528/67; 528/85
[58] Field of Search ............... 524/591, 839, 524/840, 590; 525/123, 455, 127; 528/49, 60, 61, 65, 67, 85

[56] References Cited

U.S. PATENT DOCUMENTS

| | | | |
|---|---|---|---|
| 4,663,377 | 5/1987 | Hombach et al. | 524/196 |
| 5,334,637 | 8/1994 | Zwiener et al. | 524/539 |

FOREIGN PATENT DOCUMENTS

| | | |
|---|---|---|
| 0019860 | 12/1980 | European Pat. Off. . |
| 0206059 | 12/1986 | European Pat. Off. . |
| 0557844 | 9/1993 | European Pat. Off. . |
| 4142275A1 | 6/1993 | Germany . |

*Primary Examiner*—Paul R. Michl
*Assistant Examiner*—Patrick Niland
*Attorney, Agent, or Firm*—Oblon, Spivak, McClelland, Maier & Neustadt, P.C.

[57] ABSTRACT

Water-emulsifiable polyisocyanates, containing a) aliphatic, cycloaliphatic or aromatic polyisocyanates and b) reaction products of the abovementioned polyisocyanates with compounds which contain at least one group

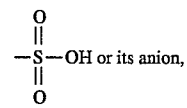

in short called a sulfo group, and at least one isocyanate-reactive group.

10 Claims, No Drawings

WATER-EMULSIFIABLE POLYISOCYANATES

The invention relates to water-emulsifiable polyisocyanates, containing a) aliphatic, cycloaliphatic or aromatic polyisocyanates and b) reaction products of the abovementioned polyisocyanates with compounds which contain at least one group

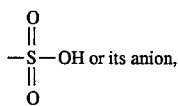

—S—OH or its anion, in short called a sulfo group, and at least one isocyanate-reactive group.

The invention furthermore relates to the use of the water-emulsifiable polyisocyanates as additives for aqueous dispersions, in particular for adhesives, coating compositions or impregnating compositions.

The performance characteristics of aqueous polymer dispersions can be improved by the addition of polyisocyanates.

Hydrophilically modified polyisocyanates, which are water-emulsifiable, have proven suitable for this purpose. EP-A-206 059, for example, discloses polyisocyanates which are hydrophilically modified with polyethylene oxide-containing alcohols. A fundamental disadvantage of these polyisocyanates is that an undesirable permanent hydrophilicity is imparted, for example, to the adhesive or the coating by the relatively high content of polyethylene oxide.

This disadvantage is avoided by the use of polyisocyanates which are hydrophilically modified by chemically bonded carboxyl groups, such as are described, for example, in DE-A-41 42 275. However, it is disadvantageous in this case that the carboxyl-containing polyisocyanates are not compatible with binders having a pH of less than about 5. It is therefore necessary to adjust such binders, as are obtained, for example, in the persulfate-initiated emulsion polymerization of olefinically unsaturated monomers and which customarily have an acidic reaction, to a pH of greater than 5, or better even higher, by addition of bases. Besides the additional complexity of the process, this has the result that the pot time, ie. the time after addition of the polyisocyanate in which the mixture can still be processed, is reduced. Furthermore, the carboxyl-containing polyisocyanates often only have an adequate shelf life if they are stored in the unneutralized state, because the carboxylic acids neutralized using tertiary amines are effective catalysts for the trimerization of NCO groups. The user is therefore forced to carry out the neutralization immediately before the emulsification, which represents a further process step.

It is an object of the present invention to make available a water-emulsifiable polyisocyanate which fulfills the following requirements:

easy incorporation into aqueous impregnating and coating compositions and adhesives, no significant increase in the hydrophilicity of the impregnating or coating compositions or adhesives, compatibility with impregnation or coating compositions or adhesives at a pH of less than 5.

We have now found that this object is achieved by the water-emulsifiable polyisocyanate defined above and its use as an additive for aqueous dispersions.

The water-emulsifiable polyisocyanates according to the invention contain a) the abovementioned polyisocyanates and b) reaction products of the polyisocyanates a) with compounds which contain at least one sulfo group according to the above definition and at least one isocyanate-reactive group.

In the water-emulsifiable polyisocyanates, the polyisocyanates a) used under b) can be identical to or different from those under a).

Examples of polyisocyanates which may be mentioned are customary diisocyanates and/or customary more highly functionalized polyisocyanates having a mean NCO functionality of 2.0 to 4.5. These components can be present on their own or in a mixture.

Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates such as 1,4-, 1,3- or 1,2-diisocyanatocyclohexane, 4,4'-di(isocyanatocyclohexyl) methane, 1-isocyanato-3,3,5-trimethyl-5-isocyanatomethylcyclohexane (isophorone diisocyanate) or 2,4-, or 2,6-diisocyanato-1-methylcyclohexane and also aromatic diisocyanates such as 2,4- or 2,6-tolylene diisocyanate, tetramethylxylylene diisocyanate, p-xylylene diisocyanate, 2,4'- or 4,4'-diisocyanatodiphenylmethane, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethyldiphenyl, 3-methyldiphenylmethane 4,4'-diisocyanate or diphenyl ether 4,4'-diisocyanate. Mixtures of the diisocyanates mentioned can also be present. Hexamethylene diisocyanate and isophorone diisocyanate are preferred.

Suitable customary more highly functionalized polyisocyanates are, for example, triisocyanates such as 2,4,6-triisocyanatotoluene or 2,4,4'-triisocyanatodiphenyl ether or the mixtures of di-, tri- and higher polyisocyanates which are obtained by phosgenation of appropriate aniline/formaldehyde condensates and represent polyphenyl polyisocyanates having methylene bridges.

Of particular interest are customary aliphatic more highly functionalized polyisocyanates of the following groups:

(a) Isocyanurate-containing polyisocyanates of aliphatic and/or cycloaliphatic diisocyanates. Particularly preferred in this context are the corresponding isocyanato isocyanurates based on hexamethylene diisocyanate and isophorone diisocyanate. The present isocyanurates are, in particular, simple trisisocyanatoalkyl or tris-isocyanatocycloalkyl isocyanurates which are cyclic trimers of the diisocyanates, or mixtures with their higher homologs containing more than one isocyanurate ring. The isocyanato isocyanurates in general have an NCO content of from 10 to 30% by weight, in particular 15 to 25% by weight, and a mean NCO functionality of from 2.6 to 4.5.

(b) Uretdione diisocyanates having aliphatically and/or cycloaliphatically bonded isocyanate groups, preferably derived from hexamethylene diisocyanate or isophorone diisocyanate. Uretdione diisocyanates are cyclic dimerization products of diisocyanates.

(c) Biuret-containing polyisocyanates having aliphatically bonded isocyanate groups, in particular tris(6-isocyanatohexyl)biuret or its mixtures with its higher homologs. These biuret-containing polyisocyanates in general have an NCO content of from 10 to 30% by weight, in particular from 18 to 25% by weight, and a mean NCO functionality of from 3 to 4.5.

(d) Urethane- and/or allophanate-containing polyisocyanates having aliphatically or cycloaliphatically bonded isocyanate groups, as can be obtained, for example, by reaction of excess amounts of hexamethylene diisocyanate or of isophorone diisocyanate with simple polyhydric alcohols such as trimethylolpropane, glycerol, 1,2-dihydroxypropane or mixtures thereof. These urethane- and/or allophanate-containing polyisocyanates in general have an NCO content of from 12 to 20% by weight and a mean NCO functionality of from 2.5 to 3.

(e) Oxadiazinetrione-containing polyisocyanates, preferably derived from hexamethylene diisocyanate or isophorone diisocyanate. Such oxadiazinetrione-containing polyisocyanates can be prepared from diisocyanate and carbon dioxide.

(f) Uretonimine-modified polyisocyanates.

Aliphatic and cycloaliphatic polyisocyanates are particularly preferred. Hexamethylene diisocyanate and isophorone diisocyanate are very particularly preferred, in particular their isocyanurates and biurets.

For the preparation of the reaction products b), the above named polyisocyanates are reacted with compounds which contain at least one, preferably one, sulfo group and at least one, preferably one, isocyanate-reactive group, eg. a hydroxyl, mercapto or primary or secondary amino group (in short an NH group).

Such compounds are, for example, hydroxy- or aminosulfonic acids or alternatively hemiesters of sulfuric acid with OH or NH groups. Compounds containing a sulfonic acid group are preferred.

Hydroxysulfonic acids are particularly preferred. Hydroxysulfonic acids having an aliphatically bonded OH group are very particularly preferred. Examples of these are hydroxysulfonic acids and the tert-ammonium and alkali metal salts derived therefrom having the following structures:

$$\begin{array}{c} HOCH_2 \\ \phantom{HOCH_2} \diagdown \\ \phantom{HOCH_2} C \\ \phantom{HOCH_2} \diagup \diagdown \\ HOCH_2 \phantom{CC} CH_2-O-(CH_2-CH-O)_l-CH_2-CH_2-CH_2-SO_3-H \\ \phantom{HOCH_2 CH_2 O CH_2 CH O CH} | \\ \phantom{HOCH_2 CH_2 O CH_2 CH O CH} R \end{array}$$

$$R'[\!\!\!+\!CH_2-CH-O\!\!\!+_m\!\!\!+\!CH_2-CH_2-O\!\!\!+_n\!\!\!+\!CH_2-CH-O\!\!\!+_o\!H]_2$$
$$\phantom{R'[\!\!\!+\!CH_2\!-\!}|$$
$$\phantom{R'[\!\!\!+\!CH_2\!-\!}R''$$
$$\phantom{R'[\!\!\!+\!CH_2\!-\!}|$$
$$\phantom{R'[\!\!\!+\!}CH_2-SO_3H$$

with a $CH_3$ group on the third segment.

where

R=H or $CH_3$,

R' and R" are divalent organic radicals, preferably having 1 to 20 C atoms, l=5 to 50 m=1 to 5 n=0 to 50 o=0 to 50

(obtainable from Goldschmidt AG).

Furthermore, compounds which can be used are ammonium sulfobetaines, as can be obtained by quaternization of tert-amines containing hydroxyl groups with propane sulfone.

Adducts of bisulfites to olefinically unsaturated alcohols can also be used, as are described, for example, in DE-A-24 17 664, DE-A-24 37 218 and DE-A-24 46 440 and the references mentioned therein.

Preferably, 2-hydroxyethanesulfonic acid and 2-hydroxypropanesulfonic acid can also be used.

For the preparation of the water-dispersible polyisocyanates according to the invention, the polyisocyanates described above are reacted with the compounds which contain both sulfo groups and isocyanate-reactive groups.

In this context, the preparation can be carried out in such a way that the NCO groups of the starting polyisocyanate and the NCO-reactive groups of the sulfo-containing compounds are reacted in equivalent amounts and the essentially NCO-free product thus obtained is mixed with the same or alternatively different polyisocyanates a).

The preparation can also be carried out in such a way that the sulfo-containing compounds are reacted with excess starting polyisocyanate.

The sulfo-containing compounds can be employed either in their acid or their salt form. The higher molecular weight sulfo-containing compounds can be used without problems in the form of their alkali metal salts, as the large organic radical has a sufficient solubility in the starting polyisocyanate. The alkali metal salts of the low molecular weight sulfo-containing compounds are in general not soluble in the reaction medium. In this case, it is advantageous to prepare the free acids according to generally known methods and either to employ them as such or in the form of their salts with tertiary amines. In the case where the free acid was used, the neutralization can either be carried out later by addition of anhydrous bases, eg. tertiary amines, to the water-emulsifiable polyisocyanate or by emulsification of the water-emulsifiable polyisocyanate in base-containing water.

The sulfo-containing compounds are used in amounts such that the water-emulsified polyisocyanate preferably has a content of chemically fixed sulfo groups of from 0.02 mol/kg up to 3 mol/kg of water-emulsified polyisocyanate. If other hydrophilic groups are additionally used, not more than 2 mol of carboxyl groups/kg of water-emulsifiable polyisocyanate or 15% by weight of ethylene oxide units, based on water-emulsifiable polyisocyanate, should be used. The additional use of other hydrophilic groups, however, is in general unnecessary.

It can be advantageous to use in the synthesis solvents which are inert to NCO, such as hydrocarbons, ketones, esters, amides or suitable lactams.

The reaction is preferably carried out at from 20° C. to 150° C.; if appropriate with additional use of customary catalysts, eg. dibutyltin dilaurate or diazabicyclooctane.

The water-emulsifiable polyisocyanates according to the invention are also stable on storage in the neutralized state, so neutralization can even be carried out at the manufacturer. They can be incorporated simply and easily into aqueous binders, in particular dispersions, at any desired pH, even at a pH of below 5. No foam formation occurs during incorporation.

The water-emulsifiable polyisocyanates are suitable as additives, ie. as crosslinking agents, for aqueous polymer dispersions, in particular for dispersions of polyurethanes or free radical-polymerized polymers. They are particularly suitable as additives for adhesives, coating compositions or impregnating compositions based on aqueous dispersions, in particular of polyurethanes or free radical-polymerized polymers.

They can also be used on their own, eg. for the finishing of textiles (see, for example, German Patent Application P 44 15 451.8).

The impregnating or coating compositions and adhesives obtained have an only insignificantly increased hydrophilicity.

EXAMPLES

Polyisocyanate PI 1:

By trimerization of some of the isocyanate groups of polyisocyanate-containing isocyanurate groups prepared from 1,6-diisocyanatohexane, which consists essentially of tris(6-isocyanatohexyl) isocyanurate and its higher homologs, having an NCO content of 22.2%, a content of monomeric diisocyanate of less than 0.3%, a viscosity at 23° C. of 1.9 Pas and a mean NCO functionality of about 3.3.

Polyisocyanate PI 2:

Biuret polyisocyanate based on 1,6-diisocyanatohexane, which consists essentially of N,N',N"-tris(6-isocyanatohexyl)biuret and its higher homologs, having an NCO content of 21.9%, a content of monomeric diisocyanate of less than 0.3%, a viscosity at 23° C. of 2.1 Pas and a mean NCO functionality of about 3.3.

Water-emulsifiable polyisocyanates

Example 1

A mixture of 6.3 g (50 mmol) of 2-hydroxyethanesulfonic acid and 5.05 g (50 mmol) of triethylamine is added to 300 g of PI 1 and stirred at 60° C. for 60 min.

A yellowish, clear resin having an NCO content of 21.0% by weight and a content of sulfo groups of 161 mmol/kg is obtained. 1 g of the resin is emulsified to give a finely divided emulsion by shaking in 10 g of water.

Example 2

The procedure is similar to Example 1 using PI 2.

A yellowish, clear resin having an NCO content of 21.8% by weight and a content of sulfo groups of 161 mmol/kg is obtained. 1 g of the resin is emulsified to give a finely divided emulsion by shaking in 10 g of water.

Example 3

300 g of PI 1 (1.59 mol of NCO) are mixed with 11 g (47 mmol) of 1,2-dimethylolnorbornane-4-sulfonic acid and 30 g of N-methylpyrrolidone and stirred at 60° C. for 60 min.

A yellowish, clear resin having an NCO content of 18.2% by weight and a content of sulfo groups of 137 mmol/kg is obtained. 1 g of the resin is emulsified to give a finely divided emulsion by shaking in 10 g of a solution of 5.5 g of NaOH in 1,000 g of water.

Example 4

The procedure is similar to Example 3 using PI 2.

A yellowish, clear resin having an NCO content of 17.9% by weight and a content of sulfo groups of 137 mmol/kg is obtained. 1 g of the resin is emulsified to give a finely divided emulsion by shaking in 10 g of a solution of 5.5 g of NaOH in 1,000 g of water.

Example 5

400 g of PI 1 are mixed with 100 g of a polyether-1,3-diol sulfonate (Tegomer® DS-3904 from Goldschmidt; OH number about 90, NaSO$_3$ content about 7.7% by weight) and stirred at 95° C. for 120 min. A clear, viscous resin having an NCO content of 16.2% by weight and which is easily emulsifiable in water is obtained.

Example 6

The procedure is similar to Example 5 using PI 2.

A clear, viscous resin having an NCO content of 16.2% by weight and which is easily emulsifiable in water is obtained.

We claim:

1. A water-emulsifiable polyisocyanate, containing
    a) aliphatic, cycloaliphatic and/or aromatic polyisocyanates and
    b) reaction products of the abovementioned polyisocyanates with compounds which contain at least one group

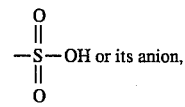

called a sulfo group, and at least one isocyanate-reactive hydroxyl group.

2. A water-emulsifiable polyisocyanate as claimed in claim 1, containing the reaction product b) in such an amount that the content of the sulfo group is 0.02 to 3 mol per kg of water-emulsifiable polyisocyanate.

3. A water-emulsifiable polyisocyanate as claimed in claim 1, wherein the compound containing at least one sulfo group and at least one isocyanate-reactive group is a hydroxysulfonic acid.

4. An aqueous dispersion of polyurethanes or free radical-polymerized polymers, containing the water-emulsifiable polyisocyanate as claimed in claim 1.

5. Adhesives, coating compositions or impregnating compositions based on aqueous dispersions, containing the water-emulsifiable polyisocyanate as claimed in claim 1.

6. A water-emulsifiable polyisocyanate as set forth in claim 1 wherein said water-emulsifiable polyisocyanate has not more than 2 mol of carboxy groups/kg of water emulsifiable polyisocyanate.

7. The water-emulsifiable polyisocyanate of claim 1 wherein said sulfo group containing compound is 1,2-dimethylolnorbornane-4-sulfonic acid.

8. The water-emulsifiable polyisocyanate of claim 1 wherein said sulfo group containing compound is selected from the group consisting of 2-hydroxyethanesulfonic acid and 2-hydroxypropanesulfonic acid.

9. The water-emulsifiable polyisocyanate of claim 8 wherein said sulfo group containing compound is 2-hydroxyethanesulfonic acid.

10. An aqueous dispersion as set forth in claim 4 having a pH of below 5.

* * * * *